United States Patent
Kundu et al.

(10) Patent No.: US 7,630,397 B2
(45) Date of Patent: Dec. 8, 2009

(54) EFFICIENT SCALABLE IMPLEMENTATION OF VCAT/LCAS FOR SDH AND PDH SIGNALS

(75) Inventors: Yudhishthira Kundu, New Delhi (IN); Santanu Bhattacharya, Delhi (IN); Vivek Gupta, New Delhi (IN); Diljit Singh, Karnal (IN); Jitender Kaul, New Delhi (IN)

(73) Assignee: Transwitch Corporation, Shelton, CT (US)

( * ) Notice: Subject to any disclaimer, the term of this patent is extended or adjusted under 35 U.S.C. 154(b) by 424 days.

(21) Appl. No.: 11/553,151

(22) Filed: Oct. 26, 2006

(65) Prior Publication Data
US 2008/0101377 A1  May 1, 2008

(51) Int. Cl.
*H04J 3/16* (2006.01)
(52) U.S. Cl. ...................................... 370/465
(58) Field of Classification Search ............... 370/392, 370/465
See application file for complete search history.

(56) References Cited

U.S. PATENT DOCUMENTS

| | | | |
|---|---|---|---|
| 4,627,016 A * | 12/1986 | Kirschner et al. | 705/405 |
| 5,548,534 A * | 8/1996 | Upp | 370/504 |
| 6,636,529 B1 * | 10/2003 | Goodman et al. | 370/469 |
| 6,965,612 B2 | 11/2005 | Chohan et al. | |
| 7,020,158 B2 | 3/2006 | Rouaud | |
| 7,031,256 B2 | 4/2006 | Hamlin, Jr. et al. | |
| 2003/0112833 A1 * | 6/2003 | Kamiya | 370/535 |
| 2004/0076175 A1 * | 4/2004 | Patenaude | 370/465 |
| 2005/0141568 A1 * | 6/2005 | Kwak et al. | 370/539 |
| 2006/0168330 A1 | 7/2006 | Gerdstrom | |
| 2006/0222005 A1 * | 10/2006 | Gorshe et al. | 370/466 |

OTHER PUBLICATIONS

ITU-T Recommendation G.7042/Y.1305, Mar. 2006.*
ITU-T—G.707/Y.1322 (Dec. 2003) Network node interface for the synchronous digital hierarchy (SDH).
ITUT-T—G.7042/Y.1305 (Mar. 2006) Link capacity adjustment scheme (LCAS) for virtual concatenated signals.
ITUT-T—G.7043/Y.1343 (Jul. 2004) Virtual concatenation of Plesiochronous Digital Hierarchy (PDH) signals.
ITU-T—G.7043/Y.1343 Amendment 1 (Jan. 2005) Virtual concatenation of plesiochronous digital hierarchy (PDH) signals.
ITU-T—G.707/Y.1322 Amendment 1 (Aug. 2004) Amendment 1 to ITU-T Recommendation G.707/Y.1322.
ITU-T—G.707/Y.1322 Corrigendum 1 (Jun. 2004) Corrigendum 1 to ITU-T Recommendation G.707/Y.1322.

(Continued)

*Primary Examiner*—Ayaz R Sheikh
*Assistant Examiner*—Hai-Chang Hsiung
(74) *Attorney, Agent, or Firm*—Gordon & Jacobson, PC

(57) ABSTRACT

An apparatus for implementing VCAT in both SDH and PDH signals includes an SDH VCAT mapper coupled to a first telecom bus and a plurality of PDH units coupled to the first telecom bus and a second telecom bus. The PDH units read SDH VCAT bytes from the first telecom bus and write PDH VCAT bytes to the second telecom bus according to a gapped clock. At the data sink RS-Ack is determined before deskewing and is latched to be reported after deskewing. During deskewing, less than the maximum delay between members is tracked, thereby using less storage. Addressing of the deskewing storage is computed using a remainder algorithm.

22 Claims, 11 Drawing Sheets

OTHER PUBLICATIONS

ITU-T—G.707/Y.1322 Corrigendum 2 (Aug. 2005) Network node interface for the synchronous digital hierarchy (SDH).

ITU-T—G.7042/Y.1305 (Feb. 2004) Link Capacity adjustment scheme (LCAS) for virtual concatenated signals.

ITU-T—G.7043/Y.1343 (Jul. 2004) Virtual concatenation of plesiochronous digital hierarchy (PDH) signals.

Pericom, Application of the Week, Apr. 28, 2004 (Week 99) Application: Line Card Frequency Translation (77.76 MHz CMOS/TTL).

Fundamentals of DS3, available at http://www.teracomm.com/appnotes/whitepapers/DS3%20Fundamentals.pdf.

* cited by examiner

FIG. 3A

EFFICIENT SCALABLE IMPLEMENTATION OF VCAT/LCAS FOR SDH AND PDH SIGNALS

CROSS-REFERENCE TO RELATED APPLICATIONS

This application is related to the following co-owned patents and application, the disclosures of which are hereby incorporated herein by reference:

U.S. Pat. No. 6,965,612, issued Nov. 15, 2005, for "Methods and Apparatus for the Hardware Implementation of Virtual Concatenation and Link Capacity Adjustment Over SONET/SDH Frames";

U.S. Pat. No. 7,020,158, issued Mar. 28, 2006, for "Methods and Apparatus for the Hardware Implementation of Virtual Concatenation and Link Capacity Adjustment Over SONET/SDH Frames";

U.S. Pat. No. 7,031,256, issued Apr. 18, 2006, for "Methods and Apparatus for Implementing LCAS (Link Capacity Adjustment Scheme) Sinking with Rate Based Flow Control"; and U.S. application Ser. No. 11/210,127, filed Aug. 23, 2005, for "Methods and Apparatus for Deskewing VCAT/LCAS Members".

BACKGROUND OF THE INVENTION

1. Field of the Invention

This invention relates broadly to telecommunications. More particularly, this invention relates to a virtual concatenation (VCAT) and link capacity adjustment scheme (LCAS) which is applicable to both the synchronous digital hierarchy (SDH also known as SONET or the synchronous optical network) and the plesiochronous digital hierarchy (PDH).

2. State of the Art

The Synchronous Optical Network (SONET) or the Synchronous Digital Hierarchy (SDH), as it is known in Europe, is a common telecommunications transport scheme which is designed to accommodate both multiple DS-1 (T1) and E1 traffic as well as multiples (DS-3 and E-3) thereof. A DS-1 signal consists of up to twenty-four time division multiplexed DS-0 signals plus an overhead bit. Each DS-0 signal is a 64 kb/s signal and is the smallest allocation of bandwidth in the digital network, i.e. sufficient for a single telephone connection. An E1 signal consists of up to thirty-two time division multiplexed DS-0 signals with at least one of the DS-0s carrying overhead information. The higher order signals like DS3 and E3 are generally formed by bit interleaving lower order signals like DS1s and E1s. The E1 signal is an exception as it is byte interleaved.

Developed in the early 1980s, SONET has a base (STS-1) rate of 51.84 Mbit/sec in North America. The STS-1 signal can accommodate 28 DS-1 signals or 21 E1 signals or a combination of both. The basic STS-1 signal has a frame length of 125 microseconds (8,000 frames per second) and is organized as a frame of 810 octets (9 rows by 90 byte-wide columns). It will be appreciated that 8,000 frames*810 octets per frame*8 bits per octet=51.84 Mbit/sec. The frame includes the synchronous payload envelope (SPE) or virtual container (VC) as it is known in Europe, as well as transport overhead. Transport overhead is contained in the first three columns (27 bytes) and the SPE/VC occupies the remaining 87 columns. All of the bits in each payload octet come from a single source. Thus, unlike PDH, SDH is byte oriented rather than bit oriented.

In Europe, the base (STM-1) rate is 155.520 Mbit/sec, equivalent to the North American STS-3 rate (3*51.84=155.520). The STS-3 (STM-1) signals can accommodate 3 DS-3 signals or 63 E1 signals or 84 DS-1 signals, or a combination of them. The STS-12 (STM-4) signals are 622.080 Mbps and can accommodate 12 DS-3 signals, etc. The STS-48 signals are 2,488.320 Mbps and can accommodate 48 DS-3 signals, etc. The highest defined STS signal, the STS-768, is nearly 40 Gbps (gigabits per second). The abbreviation STS stands for Synchronous Transport Signal and the abbreviation STM stands for Synchronous Transport Module. STS-n signals are also referred to as Optical Carrier (OC-n) signals when transported optically rather than electrically.

To facilitate the transport of lower-rate digital signals, the SONET standard uses sub-STS payload mappings, referred to as Virtual Tributary (VT) structures. The ITU calls these structures Tributary Units or TUs. This mapping divides the SPE (VC) frame into seven equal-sized sub-frames or VT (TU) groups (TUGs) with twelve columns of nine rows (108 bytes) in each. Four virtual tributary sizes are defined as follows.

VT1.5 has a data transmission rate of 1.728 Mb/s and accommodates a DS1 signal with overhead. The VT1.5 tributary occupies three columns of nine rows, i.e. 27 bytes. Thus, each VT Group can accommodate four VT1.5 tributaries.

VT2 has a data transmission rate of 2.304 Mb/s and accommodates a CEPT-1 (E1) signal with overhead. The VT2 tributary occupies four columns of nine rows, i.e. 36 bytes. Thus, each VT Group can accommodate three VT2 tributaries.

VT3 has a data transmission rate of 3.456 Mb/s and accommodates a DS1C (two DS1 signals combined) signal with overhead. The VT3 tributary occupies six columns of nine rows, i.e. 54 bytes. Thus, each VT Group can accommodate two VT3 tributaries.

VT6 has a data transmission rate of 6.912 Mb/s and accommodates a DS2 signal with overhead. The VT6 tributary occupies twelve columns of nine rows, i.e. 108 bytes. Thus, each VT Group can accommodate one VT6 tributary.

As those skilled in the art will appreciate, the original SONET/SDH scheme as well as the VT mapping schemes were designed to carry known and potentially foreseeable TDM (time division multiplexed) signals. In the early 1980s these TDM signals were essentially multiplexed telephone lines, each having the (now considered) relatively small bandwidth of 56-64 kbps. At that time, there was no real standard for data communication. There were many different schemes for local area networking and the wide area network which eventually became known as the Internet was based on a "56 kbps backbone". Since then, Ethernet has become the standard for local area networking. Today Ethernet is available in four bandwidths: the original 10 Mbps system, 100 Mbps Fast Ethernet (IEEE 802.3u), 1,000 Mbps Gigabit Ethernet (IEEE 802.3z/802.3ab), and 10 Gigabit Ethernet (IEEE 802.3ae).

In recent years it has been recognized that SONET/SDH is the most practical way to link high speed Ethernet networks over a wide area. Unfortunately, the various Ethernet transmission rates (10 Mbps, 100 Mbps, 1,000 Mbps, and 10,000 Mbps) do not map well into the SONET/SDH frame. For example, the original 10 Mbps Ethernet signal is too large for a VT-6 tributary (6.912 Mbps) but too small for an entire STS-1 (51.84 Mbps) path. In other words, under the then existing SONET/SDH schemes, in order to transport a 10 Mbps Ethernet signal, an entire STS-1 path must be used, thereby wasting a significant amount of bandwidth. Similar results occur when attempting to map the faster Ethernet signals into STS signals.

In order to provide a scheme for efficiently mapping Ethernet signals as well as other signals such as Fiber Channel and ESCON into a SONET/SDH frame, the Virtual Concatenation (VCAT) Protocol was created and has been endorsed by the ITU as the G.707 standard (ITUT-T Rec. G.707/Y.1322 (December, 2003)) which is hereby incorporated by reference herein in its entirety. Similar to inverse multiplexing, Virtual Concatenation combines multiple links (members) into one Virtual Concatenation Group (VCG), enabling the carrier to optimize the SDH/SONET links for Ethernet traffic. For example, using virtual concatenation, five VT-2 (2 Mbps) links can be combined to carry a 10 Mbps Ethernet signal, resulting in full utilization of allotted bandwidth. Two STS-1 (51 Mbps) links can be combined to carry a 100 Mbps Ethernet signal, etc. Virtual Concatenation uses SONET/SDH overhead bytes (a nibble of all H4 bytes plus the second nibble of four of the sixteen "H4" bytes) to indicate two numbers: the multiframe indicator (MFI) and the sequence number (SQ).

Part of the emerging Virtual Concatenation Protocol includes methods for dynamically scaling the available bandwidth in a SONET/SDH signal. These methods are known as the Link Capacity Adjustment Scheme or LCAS. LCAS is a powerful network management tool because customer bandwidth requirements change over time. One simple example is a network user who, during business hours, needs only enough bandwidth to support electronic mail and worldwide web access. During non-working hours, however, the same network user may wish to conduct relatively large data transfers from one location to another to backup daily transactions. It would be desirable to alter the user's available bandwidth as needed. LCAS provides a means to do this without disturbing other traffic on the link. LCAS has been endorsed by the ITU as the G.7042 standard (ITU-T Rec. G.7042/Y.1305 (February 2004)) which is hereby incorporated by reference herein in its entirety.

While Virtual Concatenation is a simple labeling protocol, LCAS requires a two-way handshake (using seven of the sixteen H4 bytes for high order, STS-1, and seventeen of the thirty-two K4 bits for low order, VT1.5). Status messages are continually exchanged and actions are taken based on the content of the messages. For example, to provide high order (STS-1) virtual concatenation, each STS-1 signal carries one of six LCAS control commands which are described as follows:

"Fixed"—LCAS not supported on this STS-1 ("Fixed" is actually inferred rather than sent as a command. It is inferred when all of the LCAS fields other than MFI and SEQ are zero.);

"Add"—Expresses an intention to add this STS-1 to a VCG, thereby increasing the bandwidth of an existing VCG or creating a new VCG (Bandwidth is increased upon acknowledgement from the sink.);

"Norm"—This STS-1 is in use and is not the last member of a VCG;

"EOS"—This STS-1 is in use and is the last payload carrying STS-1 of this VCG, i.e. the payload carrying STS-1 with the highest SQ number;

"Idle"—This STS-1 is not in use in a VCG or is about to be removed from a VCG;

"Do not use"—This STS-1 is supposed to be part of a VCG, but does not transport payload due to a broken link reported by the destination. Members of a VCG which do not carry payload are termed "inactive" whereas members which carry payload are termed "active".

The frame containing Virtual Concatenation LCAS information is called the VLI frame which contains the VLI byte and member status (MST) field which indicates one of the six LCAS control commands listed above.

Although SONET is said to be synchronous, it is actually plesiochronous. The clocks at different switches in the network actually differ in rate and also drift somewhat. Measures are provided to account for these clock differences which are seen as "justifications" in the overhead of the SONET signal. These justifications instruct the next switch in the path to add or remove "stuff bytes". The stuff bytes are controlled by pointer movements to the SONET payload.

Due to the nature of the SONET network, it is possible for individual members of a VCG to traverse different network paths between their origin and destination. Because of this, members will arrive at their destination out of order and with different delays. This situation is generally referred to as "skewing". In order to reassemble the members of a VCG in proper order without undue delay and without losing any members, the arriving members must be buffered and deskewed. Deskewing uses the multiframe indicator (MFI) as a time stamp to align all of the VCG members. Challenges to the deskewing process include: achieving minimal latency, accounting for justifications, adjusting for increases and decreases in member delay, dealing with the presence of inactive VCG members, and managing start-up and disruptions.

In its simplest form, deskewing involves placing members of a VCG in a buffer until the member with the most delay is received, then reading the members out of the buffer in the proper order. Typically, the members are written to RAM with an address based on their MFI numbers.

When link capacity is adjusted according to LCAS, the receiver acknowledges the adjustment by toggling the RS-Ack (resequence acknowledgement) bit in the LCAS control packet. Resequencing is detected through VLI control packet processing. According to the state of the art, the VLI (H4) octet is processed twice, once for deskewing and then again for resequence acknowledgment after deskewing.

From the foregoing, those skilled in the art will appreciate that VCAT and LCAS are powerful tools for linking together LANs from all over the industrialized world. However, as initially implemented VCAT and LCAS only operate between SONET (SDH) nodes. In order for a business to couple its LAN to others around the world, the LAN must first be coupled to a SONET (SDH) node. If the business is close enough to a SONET (SDH) node, the LAN can be coupled to it via a standard Ethernet LAN connection. Alternatively, the business can install its own SONET (SDH) node and couple it by fiber to the public SONET (SDH) network. However the former is frequently not an option and the latter can become expensive if fiber needs to be laid from the business to the public network.

Concurrently with the development of SONET(SDH), VCAT, and LCAS, standards were being set for the transmission of packet data such as Ethernet over existing DS1, E1, and DS3 links which were originally installed to carry telephone calls and low bandwidth data transmissions. In 1998 the ITU-T updated Recommendation G.704 (October 1998) (hereby incorporated by reference herein in its entirety) which defines synchronous frame structures at bit rates equivalent to existing T1 (DS1) 1.544 Mbps, E1 2.048 Mbs, T2 (DS2) 6.312 Mbps, E3 8.448 Mbps, and T3 (DS3) 44.736 Mbps bit rates. These frame structure definitions created what is now referred to as the plesiochronous digital hierarchy (PDH). With these frame structures defined, the ITU-T adopted Recommendation G.832 (October 1998) (hereby incorporated by reference herein in its entirety) which defined framing and multiplexing structures for the transport of "SDH elements on PDH networks."

Those skilled in the art will appreciate that T1, and to a lesser extent T3, links between large and mid-size business and the public network became ubiquitous as early as the 1980's. During the 1980's data communication techniques were established whereby data communications could take place over public and private networks using T1 and T3 backbones. With the definition of the PDH, it became easier for organizations having T1 or T3 connections to link their LAN to the public SONET (SDH) network.

Recently, the ITU-T adopted Recommendation G.7043/Y.1343 (July 2004) and Amendment 1 (January 2005) (hereby incorporated by reference herein in their entirety) which describes VCAT for PDH signals. While VCAT for PDH is similar to VCAT for SONET/SDH, there are significant differences due to the differences between PDH and SDH. As mentioned above PDH is generally bit interleaved whereas SDH is byte interleaved. This makes PDH VCAT members incompatible with SDH VCAT members unless they are byte aligned first. In addition, SDH VCAT is defined at the SDH path level but the members are multiplexed to a line at a line rate. Thus, the VLI frame is inherently multiplexed at the SDH line rate. PDH VCAT is defined at the PDH line level. Thus, the PDH VLI frame is not tied to the SDH line rate. LCAS is implemented in the same way for PDH and SDH.

Implementing VCAT when connecting a LAN to a SONET network via PDH links requires equipment at the point where Ethernet is mapped onto PDH. Once the Ethernet over PDH (EoPDH) signal is received at the SONET node, it is treated just like any PDH signal and the fact that it contains Ethernet packets is irrelevant to the SONET network. When the EoPDH over SONET (EoPDHoSDH) signal reaches its destination SONET node, the PDH streams are extracted and sent via PDH links to equipment which is configured to extract the Ethernet packets and place them on an Ethernet LAN. This system works if both the origin and destination are coupled to the SONET network by PDH links. If however, one end user is coupled by PDH and the other end user is coupled by SDH, they cannot properly communicate. This is because of the differences described above in the manner in which VCAT is implemented for SDH and PDH.

The state of the art solution to this problem is to provide the SDH connected user with a PDH connection as well. Two separate VCAT/LCAS units are provided, one for the SDH link and one for the PDH link. This solution essentially doubles the amount of VCAT/LCAS processing equipment which makes it expensive. Moreover, since it is desirable to provide VCAT/LCAS solutions on a single chip, the state of the art solution either fails to accomplish that result or requires design of a much larger chip to implement VCAT/LCAS.

SUMMARY OF THE INVENTION

It is therefore an object of the invention to provide an implementation of VCAT/LCAS which can be used for both SDH and PDH.

It is another object of the invention to provide an implementation of VCAT/LCAS which is efficient.

It is a further object of the invention to provide an implementation of VCAT/LCAS which is scalable.

It is also an object of the invention to provide an implementation of VCAT/LCAS which can be used for both SDH and PDH and is less expensive than current solutions.

In accord with these objects, which will be discussed in detail below, the present invention provides a unit which is coupled at one end to an Ethernet source and at the other end to an SDH link. Two telecom buses are provided, a master and a slave. The master is coupled to a SONET link via a SONET framer and the slave and master are selectively coupled to the Ethernet source via a GFP mapper and an SDH VCAT/LCAS unit. The slave telecom bus is coupled to the master telecom bus by a plurality of PDH units. Each PDH unit includes a parallel to serial converter, a PDH framer, and a PDH mapper. When the Ethernet destination is coupled to the SONET network directly (EoS), the output of the SONET VCAT/LCAS mapper is sent from the slave telecom bus directly via the master telecom bus to the SONET framer. When the Ethernet destination is coupled to the SONET network via one or more PDH links, the output of the SONET VCAT/LCAS mapper is sent via the slave telecom bus through one or more PDH units (corresponding in number and kind to the destination PDH link(s)) to the master telecom bus and then to the SONET framer. The slave telecom bus is provided with a gapped SPE signal which matches the rate of the PDH payload. The output(s) of the PDH units have the same format as an EoPDH signal on the master telecom bus.

When receiving EoS, the frames are sent directly to the SDH VCAT/LCAS unit. When receiving EoPDHoS the frames are sent to the PDH units before being sent to the SDH VCAT/LCAS unit. SDRAM is coupled to the SDH VCAT/LCAS unit for deskewing members of a concatenated group which arrive out of order. Normally, the amount of memory needed for storing a VCG while deskewing is equal to the number of members in the group times the address range of the members. According to an efficient aspect of the invention, SDRAM is addressed in such a way that much less than the usual amount of memory is needed to deskew a VCG. According to this aspect of the invention, a tolerable amount of delay between members is chosen. This tolerable amount of delay is some small fraction of the maximum possible delay. In order to provide finer granularity in delay detection, the invention divides the VLI frame into twenty-five byte chunks and defines a "chunk value" as the MFI value times the number of chunks per VLI frame. Since the compensated delay according to the invention is much smaller than the maximum delay, less RAM is needed. If the delay exceeds the tolerable delay, the group member is bad and a "do not use" LCAS message is sent to the source. Addresses for storing chunks in RAM are generated by dividing the chunk value by the address range for the VCG which gives a quotient and a remainder. The remainder is used to calculate the address for storing the chunk in RAM. The division is performed in hardware by subtracting the divisor from the dividend repeatedly until the dividend is no longer greater than or equal to the divisor, but represents the remainder of long division.

According to another efficient aspect of the invention, VLI (H4) processing occurs only once. The sequence is checked and the RS-Ack bit is latched if needed. MST information can be sent before deskewing. Deskewing is then performed and after deskewing, the RS-Ack is set in the LCAS control packet which is sent to the source.

Additional objects and advantages of the invention will become apparent to those skilled in the art upon reference to the detailed description taken in conjunction with the provided figures.

BRIEF DESCRIPTION OF THE DRAWINGS

FIG. 3A is a schematic illustration of the gapped data bytes of a DS3 signal in relation to other parts of the frame;

FIG. 7 is a high level block diagram and FIG. 7A is a flow chart illustrating RS-Ack processing according to the invention;

DETAILED DESCRIPTION OF THE PREFERRED EMBODIMENT

Figure 1:
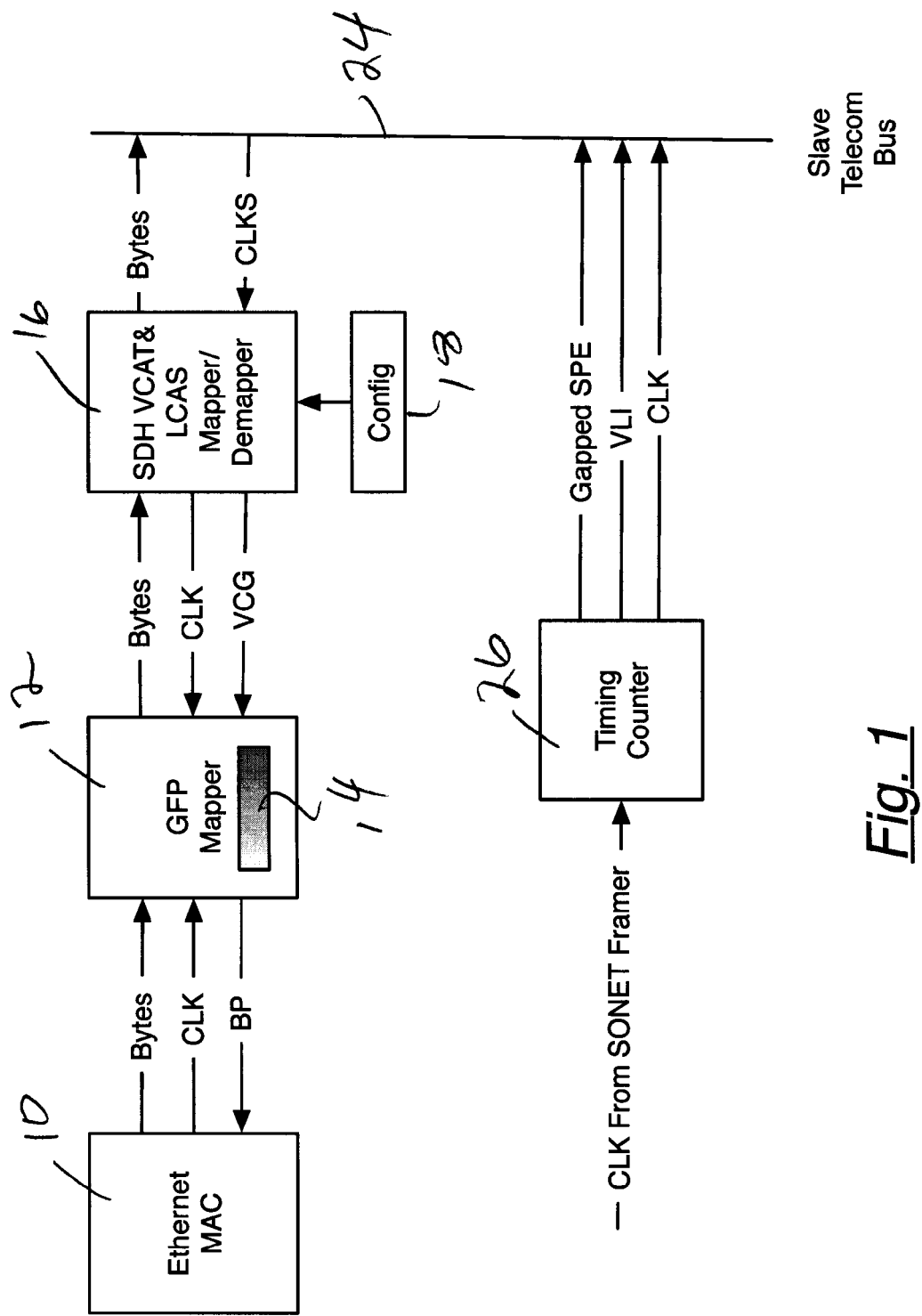
FIGS. 1 and 2 are high level schematic block diagrams illustrating the upstream processing of EoS and EoPDHoS according to the invention.
Figure 2:
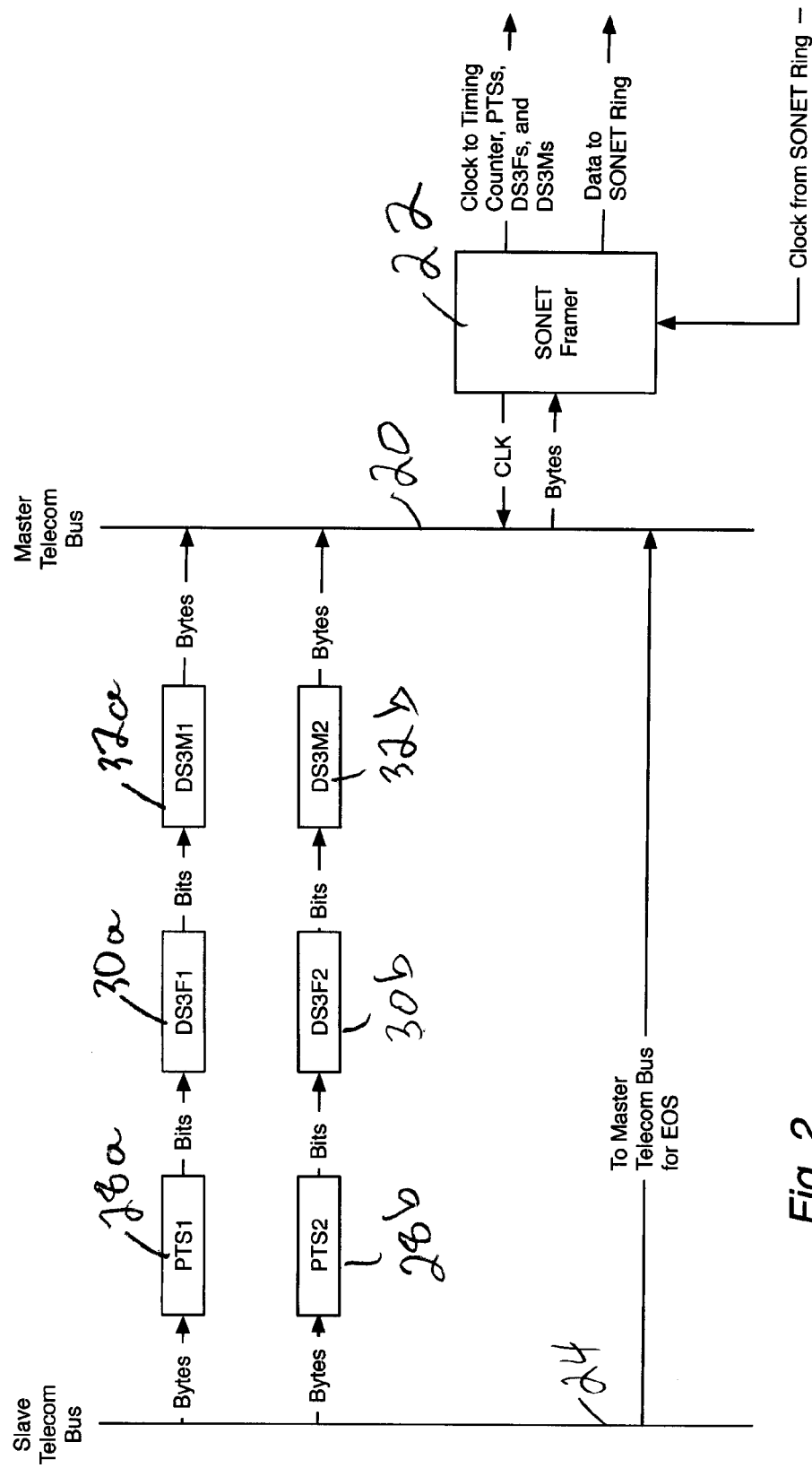

Turning now to FIGS. 1 and 2, in an "upstream" direction, a source of packets, e.g. Ethernet MAC (Medium Access Control) 10 is coupled to a GFP (Generic Framing Procedure) Mapper/Demapper 12. Use of the GFP Mapper/Demapper allows different kinds of packets (Ethernet, Fibre Channel, ESCON, FiCON, etc.) to be treated in the same way from this point onward. Although the invention is applicable to all different kinds of packets, Ethernet is used herein throughout as a typical example.

The MAC 10 controls the data link to the GFP Mapper/Demapper 12, removes the preamble and SOF (start of frame) octet from the Ethernet frames, extracts the data, checks the CRC, and identifies the end of frame. It then sends data bytes and clock (CLK) to the GFP Mapper/Demapper 12 and the GFP Mapper/Demapper 12 sends the MAC 10 a backpressure (BP) signal. The BP signal is based on the fullness of a data buffer 14 which is part of the GFP Mapper/Demapper 12 and which stores bytes received from the MAC 10 while they are being framed.

The GFP Mapper/Demapper 12 stores the Ethernet frame data in buffer 14, adds a GFP header with an indication that the source of the data was Ethernet, calculates the frame length and puts it in the header, and calculates and appends a CRC-32 to the GFP frame. The GFP Mapper/Demapper 12 also generates GFP Null frames (five bytes each) when there is no Ethernet data to be framed.

The GFP Mapper/Demapper 12 supplies GFP framed bytes to an SDH VCAT Mapper/Demapper 16. The SDH VCAT Mapper/Demapper 16 reads the bytes from the GFP Mapper/Demapper 12 based on a SONET clock which the SDH VCAT Mapper/Demapper 16 supplies to the GFP Mapper/Demapper 12. The VCG ID is sent to the GFP Mapper/Demapper to indicate which bytes and what order (sequence number) to byte interleave the data among the byte slots on the slave telecom bus. The SDH VCAT Mapper/Demapper 16 generates the H4 or VLI bytes from the clock and from a frame input received from the GFP Mapper/Demapper 12, monitors the received status and LCAS control, distributes the bytes from the GFP Mapper/Demapper 12 round robin as provided by ITU-T Recommendation G.7043, Amendment 1, paragraph 6.4.2, and labels members of the VCAT group according to the VCAT for SDH standard.

The SDH VCAT Mapper/Demapper 16 is configurable as suggested by the Config block 18 shown in FIG. 1 to operate in one of two modes: Ethernet over SONET (EoS) or Ethernet over PDH over SONET (EoPDHoS). In the first mode (EoS), the SDH VCAT mapped GFP frames are sent to a slave telecom bus 24 and from the slave telecom bus 24 directly to a master telecom bus 20 (FIG. 2). As seen in FIG. 2, a SONET Framer 22 reads bytes from the bus 20 using a SONET clock which it obtained as a function of the SONET network element. The SONET Framer 22 writes SONET frames to the SONET ring and also supplies the SONET clock to other parts of the apparatus as described in more detail below. The first mode of operation is thus an implementation of normal EoS.

In the second mode of operation (EoPDHoS), the same SDH VCAT Mapper 16 places bytes on the slave telecom bus 24. The telecom bus 24 receives a SONET clock from the SONET Framer 22 via a timing counter 26 which also provides the telecom bus 24 with VLI indication and a gapped SPE signal. The gapped SPE signal in this example is a standard STS-1 SPE signal gapped for a DS-3 PDH signal. The gapping is described in more detail below with reference to FIGS. 3 and 3A. The second mode of operation is thus an implementation of EoPDHoS using the same SDH VCAT Mapper 16 that was used for EoS in the first mode of operation.

As seen in FIG. 2, two parallel to serial converters 28a, 28b receive bytes from the slave telecom bus 24 and convert them into two serial bit streams which are received by two respective DS3 Framers/Synchronizers 30a, 30b which output bit serial DS3 signals. The framed DS3 signals are then read by a respective pair of DS3 Mappers/Demappers 32a, 32b which output an STS-1 signal with the DS3 mapped into it. The DS3 Mappers/Demappers 32a, 32b generate stuff positions, load bits of DS3 signal from the DS3 Framers/Synchronizers 30a, 30b, calculate the need for stuff bytes, and place bytes on the master telecom bus 20. The SONET Framer 22 reads the bytes from the telecom bus 20 and sees them as two SONET mapped DS3 signals. According to one embodiment, the SONET Framer 22 is an STS-12 framer which frames up to twelve DS3s or three hundred thirty-six DS1s in up to sixty-four VCGs. This makes the implementation "scalable".

Figure 3:
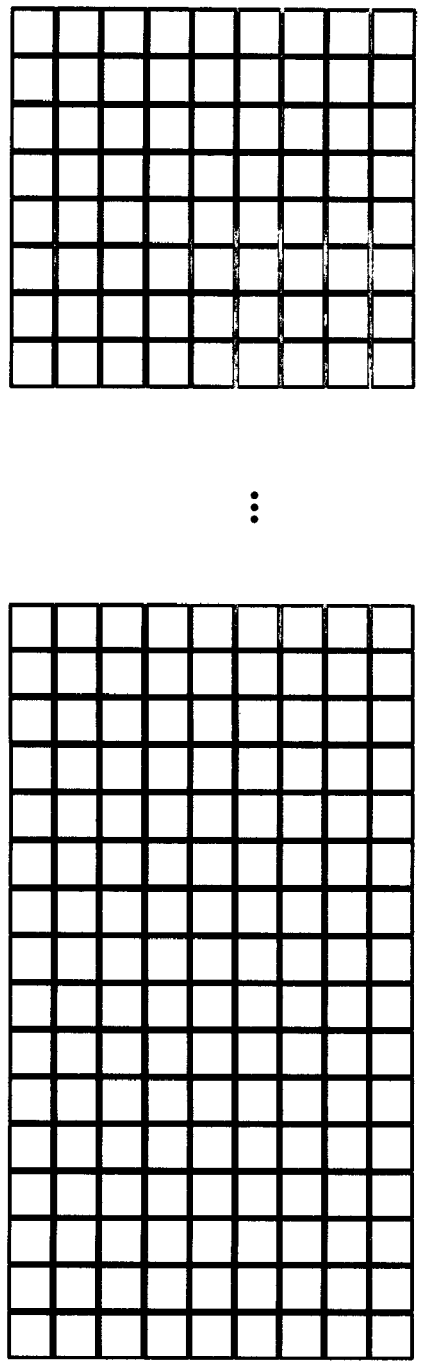
FIG. 3 is a conceptual diagram illustrating a gapped SPE signal according to the invention.
Figure 3:
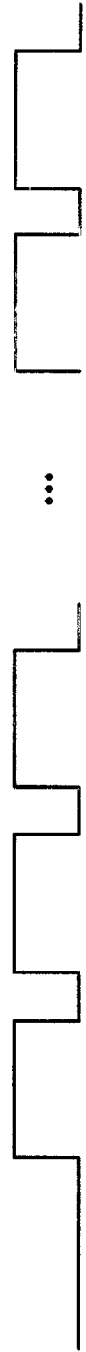

Turning now to FIG. 3, an STS-1 frame is illustrated with byte locations at the top of FIG. 3 and the normal STS-1 SPE signal is shown below it. The STS-1 signal has eighty-four payload bytes per row of the SONET frame. The first three bytes in each row are transport overhead (TOH) bytes and the STS-1 SPE is low during the TOH. It goes high at byte four to indicate the start of the payload envelope (SPE). Path overhead (POH) bytes can be located in any column which is pointed to by the H1 and H2 pointer bytes but are shown in FIG. 3 as being in the fourth column for simplicity. The thirtieth and fifty-ninth bytes of each row are fixed stuff. Thus, of the ninety bytes in each row, six are not data. Thus, the data payload is eighty-four bytes. A DS3 signal has the equivalent of seventy-seven and two thirds bytes per STS-1 row. In order to properly map the data bytes of a DS3 signal into an STS-1 payload envelope, the invention utilizes a gapped SPE signal. The gapped SPE signal according to the invention is shown conceptually underneath the standard SPE signal in FIG. 3. In addition to remaining low during the TOH, it also remains low during the POH bytes. Starting with the fifth byte, the gapped SPE goes high and then periodically goes low so that some of the bytes of each STS-1 row are not filled with DS3 data. Thus, the DS3 data in the STS-1 payload envelope is gapped according to the gapped SPE signal. According to the presently preferred embodiment, the gapped SPE signal goes low during fixed stuff, justification control, overhead, and every eighty-fifth byte (which contains eight framing bits).

Figure 3A:
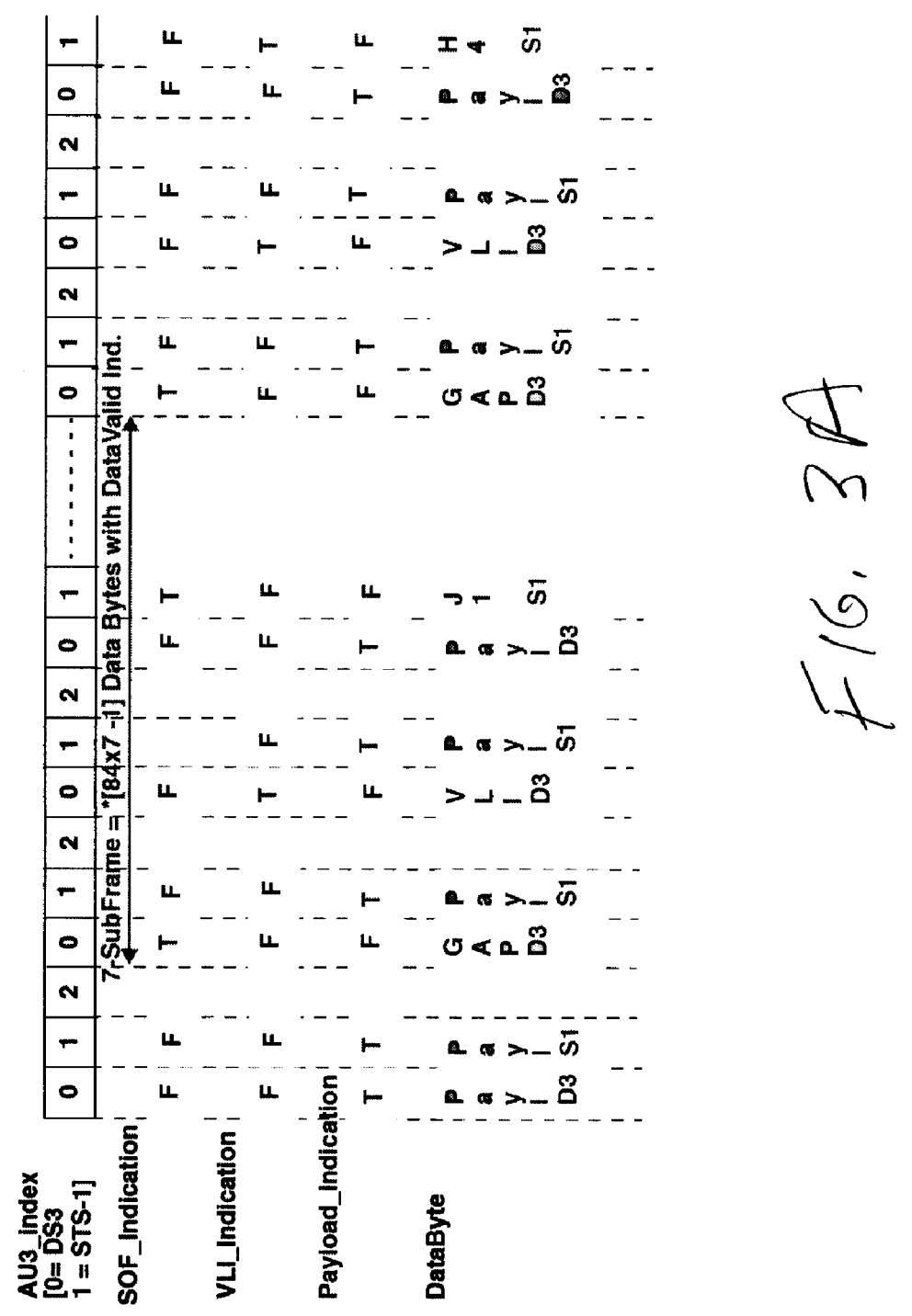

FIG. 3A shows one DS3 signal and one STS-1 signal mapped into the columns of an STS-3 frame. The frame shows repeating columns zero, one, and two. The DS3 is mapped into column zero. The STS-1 is mapped into column one and column two is unused. It will be seen that when the "payload_indication" (SPE) goes low (F-false) and the VLI indication is also low (F-false) in column zero, the DS3 signal is gapped. When the VLI signal is high (T-true) in column zero, the DS3 VLI (DS3 SOF) is written. It will also be seen that the STS-1 VLI byte is the H4 byte and the J1 byte is the STS-1 start of frame byte. The invention identifies the byte after the DS3 frame bit as the SDH H4 (VLI) byte. The invention defines the PDH multiplexing bus structure similar to the inherent SONET/SDH path multiplexing. The DS3 depicted in FIG. 3A uses AU3 index=0. At the start of frame, which is a single serial DS3 bit, the payload may be gapped representing the fact that not enough data bits have been collected to make up a byte. The DS3 VLI byte repeats once per DS3 frame which is less than one SONET/SDH frame. An STS-1 is shown with AU3 index=1. J1 is the start of frame and no data is used from this position. The higher rate of the STS-1 payload tends to use more payload bytes as being valid. The STS-1 VLI byte is the H4 byte.

Figure 4:
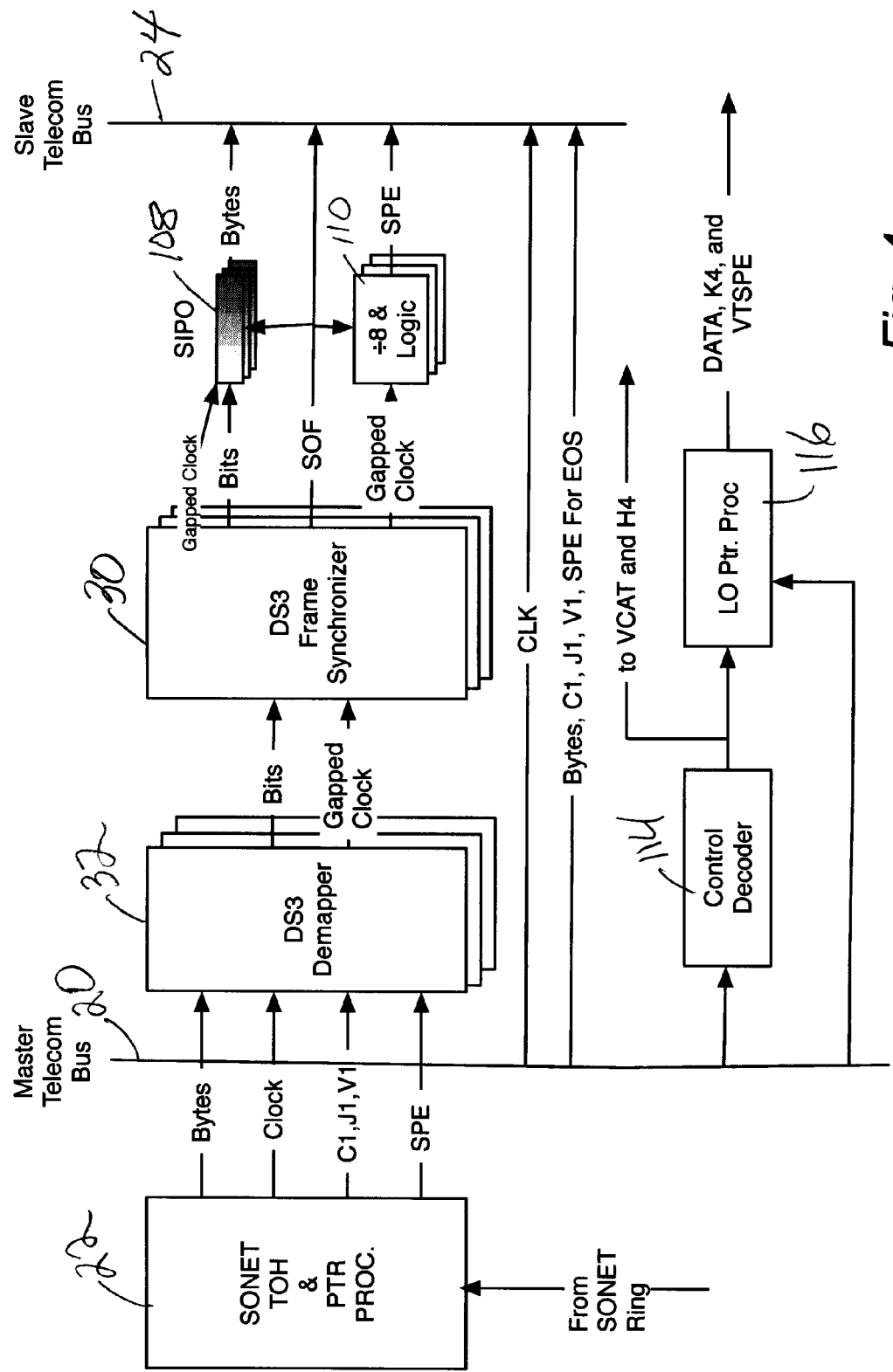
FIGS. 4 and 5 are high level schematic block diagrams illustrating the downstream processing of EoS and EoPDHoS according to the invention.
Figure 5:
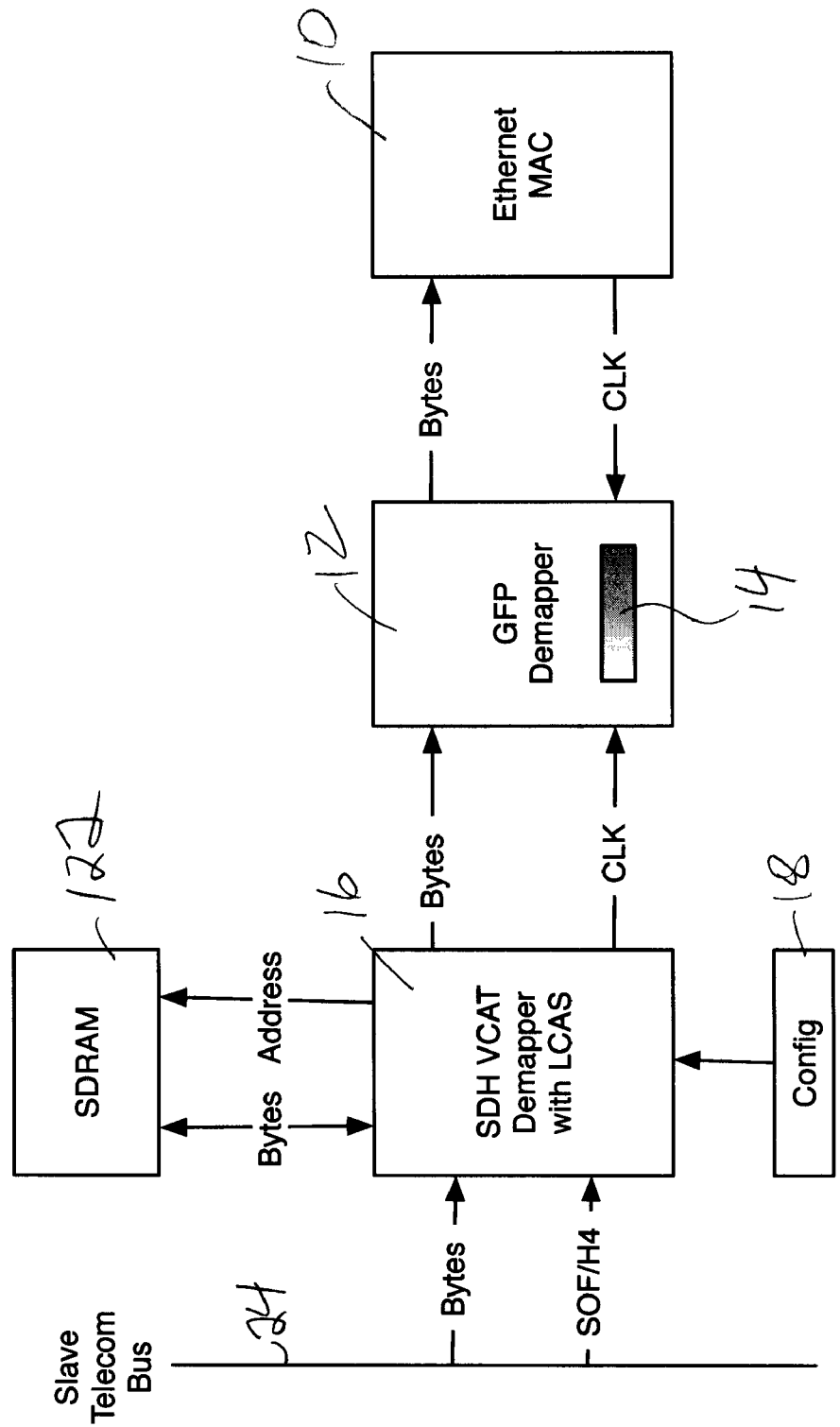

Referring now to FIGS. 4 and 5, in the downstream direction, a SONET overhead and pointer processor 22 (this is actually part of the SONET Framer described above with reference to FIG. 2) is coupled to the master telecom bus 20 and supplies the bus with data bytes, SONET clock, and the C1, J1, V1 bytes which are SPE indications. When processing EoS, data, C1, J1, and V1 are sent from the master telecom bus 20 directly to the slave telecom bus 24 and the SDH VCAT mapper/demapper 16 is configured via the config block 18 to read directly from the SONET block 22.

For processing EoPDHoS, a plurality of DS3 Mappers/Demappers 32 (these are actually part of the mappers described above with reference to FIG. 2) are coupled to the bus 24 and provide DS3 bit streams and gapped clocks to a plurality of DS3 Frame Synchronizers 30 (these are actually part of the framers described above with reference to FIG. 2). Each DS3 Frame Synchronizer 30 outputs a synchronized DS3 bit stream, an SOF pulse and the gapped clock. Serial to parallel converters 108 convert each DS3 bit stream to bytes. Divide by eight and logic block 110 converts the gapped clock and SOF signals to a gapped SPE. Downstream processing also includes a control decoder 114 which is coupled to the master telecom bus 20, and reads the non-data signals thereof and a low order pointer processor 116 which is coupled to both the control decoder and the telecom bus 20 reading the data portion thereof.

In the embodiment shown, the control decoder 114 counts the 77.76 MHz (622.08÷8) STS-12 line card clock. Using the SPE as an enable signal, it indicates each of the twelve V1 byte for low order pointer processing (e.g. 336 VT1.5/VC11 or 252 VT2/VC12). The control decoder provides address information as defined by ITU-T Recommendation G.707 to the VCAT processor (16 in FIG. 5), the low order pointer processor 116, and the demappers 32. It also provides the K4 byte to the VCAT processor 16. The low order pointer processor 116 gets the V2 byte from the V1 byte and tracks start of payload (V5 byte) and the VLI position (K4 byte).

The demappers 32 use information provided by the pointer processor 22 to decode justification control bits, separate stuff from data, remove fixed stuff and overhead, and provide a gapped clock with only payload data bits to the frame synchronizers 30.

The frame synchronizers 30 hunt for the frame pattern, identify the VLI byte from the frame pattern, and identify framing overhead bits before providing data bits, SOF and gapped clock to the blocks 108, 110 and SOF to the slave telecom bus 24.

The serial-in parallel-out (SIPO) block 108 aligns data bytes to frame position, identifies the VLI byte, and rate adapts the serial data to parallel data with a gapped 77.76 MHz clock. The divide by eight and logic 110 generates the gapped SPE valid signal (see FIG. 3). The serial data is clocked at 77.76 MHz but gapped to the payload rate of the DS3. The divide by eight converts bits to bytes when eight bits are received. The slave telecom bus clock together with the assigned slot position (AUG-1 and AU-3 indices) takes the data across the bus to the VCAT demapper.

Referring now to FIG. 5, the configuration block 18 configures the SDH VCAT mapper/demapper 16 to either process EoPDHoS or EoS. In the case of EoS, the information from telecom bus 20 goes directly to telecom bus 24. The configurable (via configuration block 18) SDH VCAT mapper/demapper 16 receives data bytes and SOF/H4 bytes from the telecom bus 24, writes data bytes to SDRAM 122 and then reads them out in correct order. The addressing of the SDRAM 122 is described in detail below with reference to FIGS. 8 and 9. The output of the SDH VCAT Demapper 16 is GFP frame bytes and a clock which is supplied to a GFP Mapper/Demapper 12. The GFP Mapper/Demapper 12 converts the received GFP frames to Ethernet frames. The Ethernet MAC 10 is coupled to the GFP Mapper/Demapper 12 and clocks bytes out of the GFP Mapper/Demapper buffer 12 according to its own clock.

The DS3 Mapper/Demappers are substantially the same as the commercially available TRANSWITCH TL3M Mapper/Demappers or equivalents thereof. The DS3 Frame Synchronizers are substantially the same as commercially available TRANSWITCH DS3F framers or equivalents thereof. Direct Ethernet to SONET may be accomplished by the commercially available TRANSWITCH EtherMap-12 device or equivalents thereof.

The invention has thus far been described with reference to virtually concatenated DS3 signals. However, the invention is also applicable to virtually concatenated DS1 signals. In the case of DS1 VCAT, the processing upstream is much simpler because the STS-1 frame rate is nominally the same as the DS1 frame rate (i.e. twenty-eight DS-1 signals per STS-1). Each DS1 frame is composed of one hundred ninety-three bits (twenty-four octets plus one SOF bit). Each VT1.5 is composed of twenty-seven bytes. According to the invention the frame bit of the DS1 is gapped out and a VT SPE is created which gaps out pointers and POH bytes so that only the twenty-four data octets of the DS1 are written to the VT1.5. Once every twenty-four VT1.5 frames a VLI is written. The DS1 Mapper/Demappers can be commercially available TRANSWITCH TEMx28 mapper/demappers or equivalents thereof and the framer can be a commercially available TRANSWITCH PHAST-12N STS-12 framer or equivalents thereof. According to an aspect of the invention, the frame bit of the DS1 is not used for the payload. The 24 data octets plus the frame bit are written to the VT1.5. Once every twenty-four DS1 frames, the first byte after the frame bit is written as the VLI byte. A VTSPE is used to gap out the pointer bytes (V1, V2, V3 and V4) one of which occurs per STS-1 frame per VT1.5 and the POH bytes (V5, J2, K4 and N2) one of which occurs per STS-1 frame per VT1.5. Stuff and stuff control positions occur on the byte used to carry the DS1 frame bit.

In the downstream processing of virtually concatenated DS1 signals, DS1 demappers and DS1 frame synchronizers take the place of the DS3 demappers and synchronizers described above with reference to FIG. 4. The input to the DS1 demappers is provided by the low order pointer processor (116 in FIG. 4) which provides data and VT SPE signals to the demappers. Processing after this point is the same as DS3.

Figure 6:
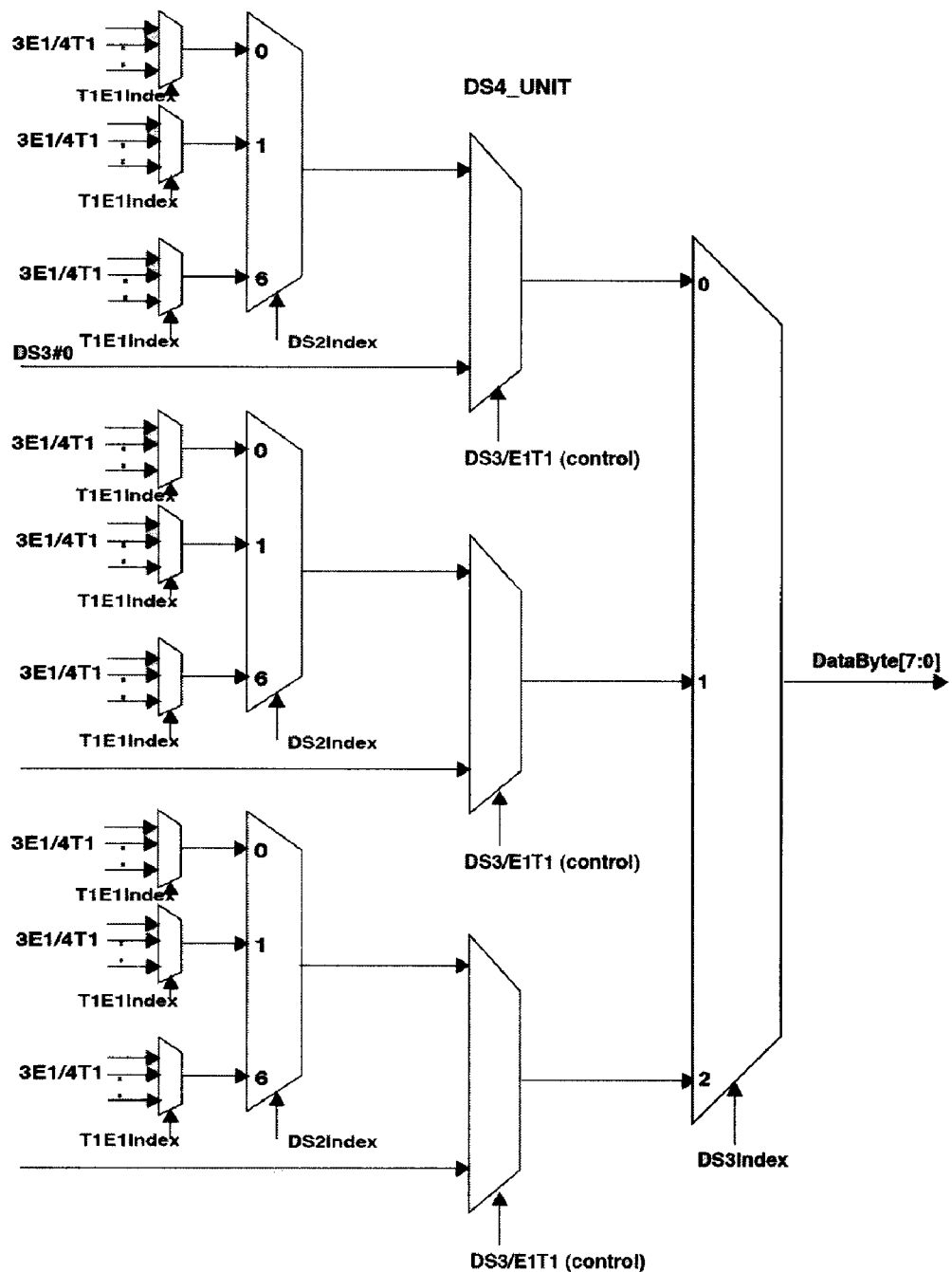
FIG. 6 is a high level block diagram illustrating the PDH multiplexing structure implemented by the invention.
Figure 4:
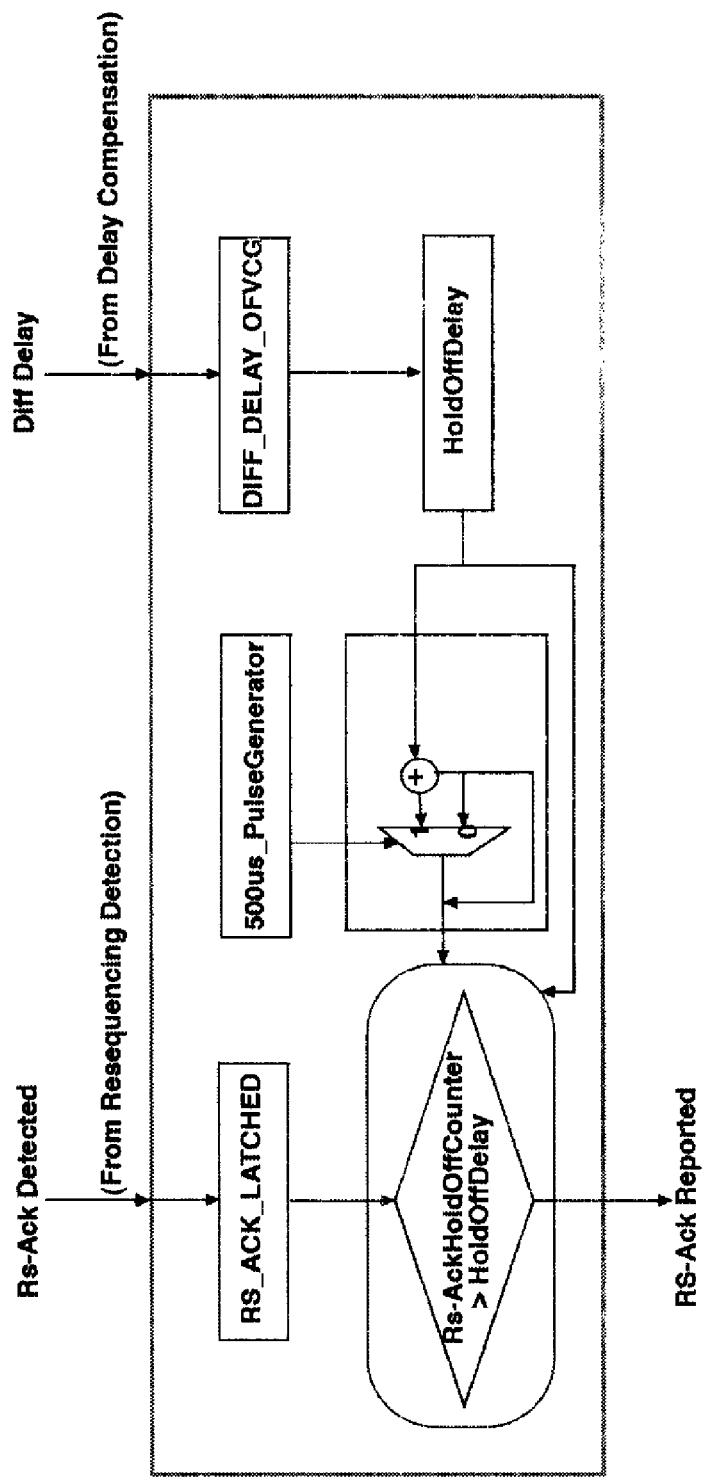

Turning now to FIG. 6, the invention implements a multiplexing scheme for EoPDHoS which mirrors the multiplexing scheme inherent in the SONET hierarchy. Thus, those skilled in the art will appreciate that the multiplexing hierarchy of DS1, DS2, and DS3 signals shown in FIG. 6 mirrors the hierarchy shown in FIG. 5 of ITU-T Recommendation G.7043. Importantly, according to the invention, the virtually concatenated PDH signals are put into SONET containers using a gapped SONET clock. This rate adapts the clocks of the PDH signals to the rate of the SDH signals.

Figure 7A:
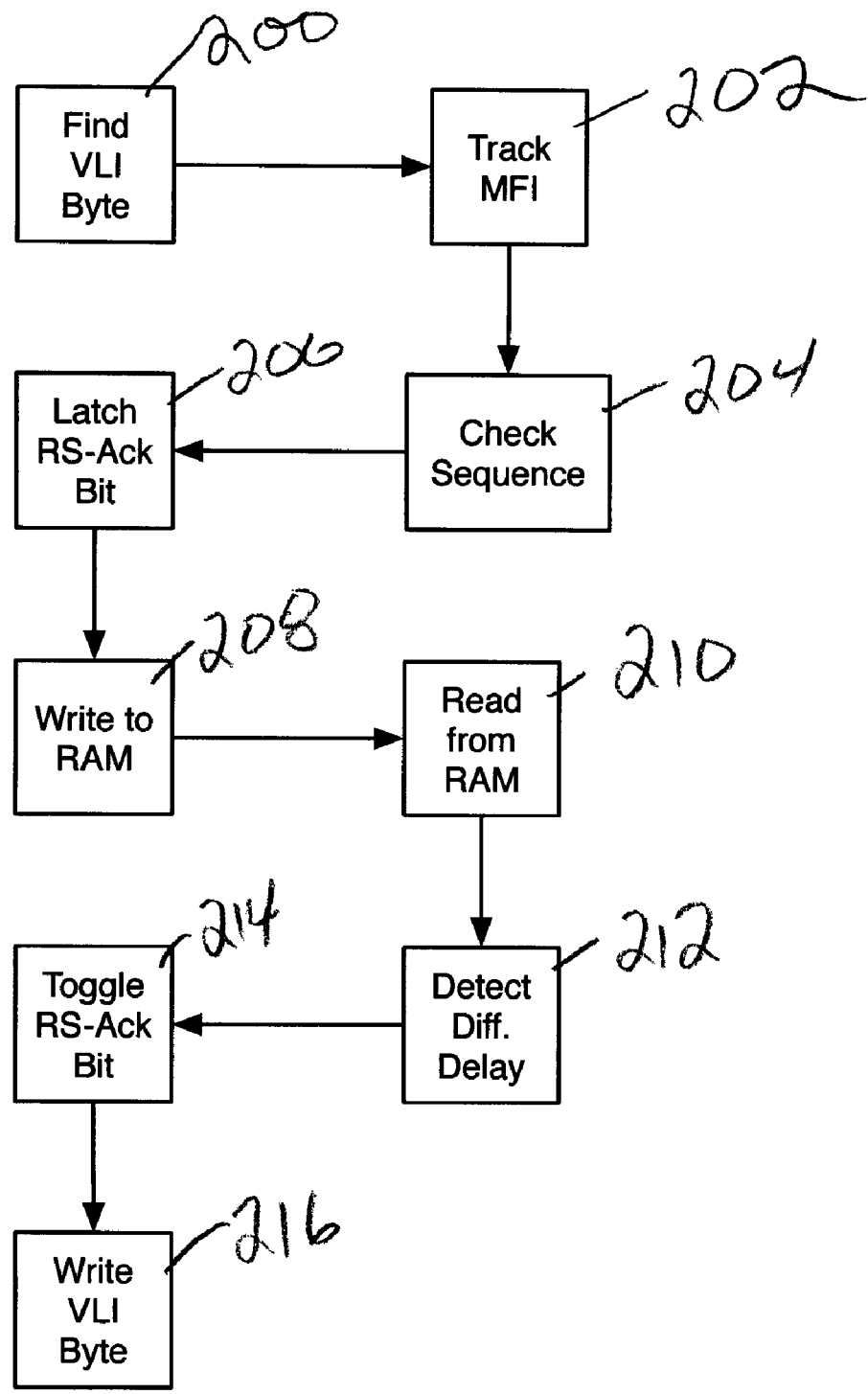

According to the presently preferred embodiment, the implementation of LCAS is made more efficient by processing MFI tracking only once per VCG in order to deskew and generate an RS-Ack. Unlike the state of the art, the invention proceeds in the following order as illustrated in FIG. 7A: find the VLI byte at 200, track MFI at 202, check the sequence at 204, latch the RS-Ack bit at 206 if there has been a resequencing, write RAM at 208 as described below with reference to FIGS. 8 and 9, read RAM at 210 to deskew, detect the differential delay at 212, and toggle the RS-Ack bit at 214 according to the latched bit. If the differential delay is unacceptable a "do not use" (DNU) command is placed in the MST field at 216. The RS-Ack and MST fields are shown in FIG. 6-2 of ITU-T Recommendation G.7043/Y.1343.

FIG. 7 shows an example of how the RS-Ack is latched at 206 of FIG. 7A until the differential delay is identified at 212 of FIG. 7A. The RS-Ack is determined from resequencing detection and latched as shown in FIG. 7. The differential delay that is calculated from the MFI is also calculated from the delay compensation for each member of the VCG which is also latched as the HoldOffpelay. Every 500 microseconds the RS-Ack HoldOffCounter is incremented and compared to the HoldOffpelay. Once the RS-Ack HoldOffCounter exceeds the HoldOffpelay the RS-Ack can be reported in the VLI byte sent by the VCAT block at 216 of FIG. 7A.

As mentioned above with reference to FIG. 5, the invention makes more efficient use of RAM by implementing an acceptable differential delay value which is much smaller than the maximum possible differential delay and by only tracking member frames which are within the acceptable delay value.

The maximum compensable delay between VCG members is two thousand forty-eight VLI frames. This is half of the MLI1+MLI2 modulus. If members are delayed any more than that, it is impossible to know which member is early and which is late. If one were to compensate for the maximum compensable delay, it would require more than two megabytes of RAM for each DS3. According to one aspect of the invention only much smaller delays, e.g. one hundred VLI frames, are tolerated. Thus, in one embodiment of the invention, the storage for VCG will only be ten VLI frames per member. In another embodiment of the invention, the amount of storage is configurable.

In another embodiment, to provide better granularity over the range of VLI frames, each frame is divided into chunks of, e.g. twenty-five bytes and the individual chunks are tracked.

In order to track chunks, each chunk is given a "Chunk_Value" (or chunk number) which has a range of the MFI range multiplied by the number of chunks in a VLI frame, which, in the case of a 250 byte VLI frame, is ten chunks. Thus, the Chunk_Value has a range of over forty thousand rather than the MLI range of about four thousand.

The addressing scheme for the deskew RAM needs to roll over when the RAM is filled, in this case every one hundred VLI frames. According to one aspect of the invention, a long division of the Chunk_Value is implemented in order to calculate an address for storing member frames in the deskew RAM. The general formula for calculating the addresses is given as the following equation where "i" is the member number and "%" is a remainder function:

$$Address(i) = (Chunk\_Value \% Address\_Range\_for\_VCG) + i*Address\_Range\_for\_VCG.$$

The remainder function divides Chunk_Value by the Address_Range_for_VCG, ignores the quotient and uses the remainder. The Address_Range_for_VCG is the maximum delay to be compensated, in this example, the delay associated with one hundred frames. Thus, the first address for the first member will be zero plus some number between zero and nine. The second address for the second member will be ten plus some number between zero and nine, etc.

Figure 8:
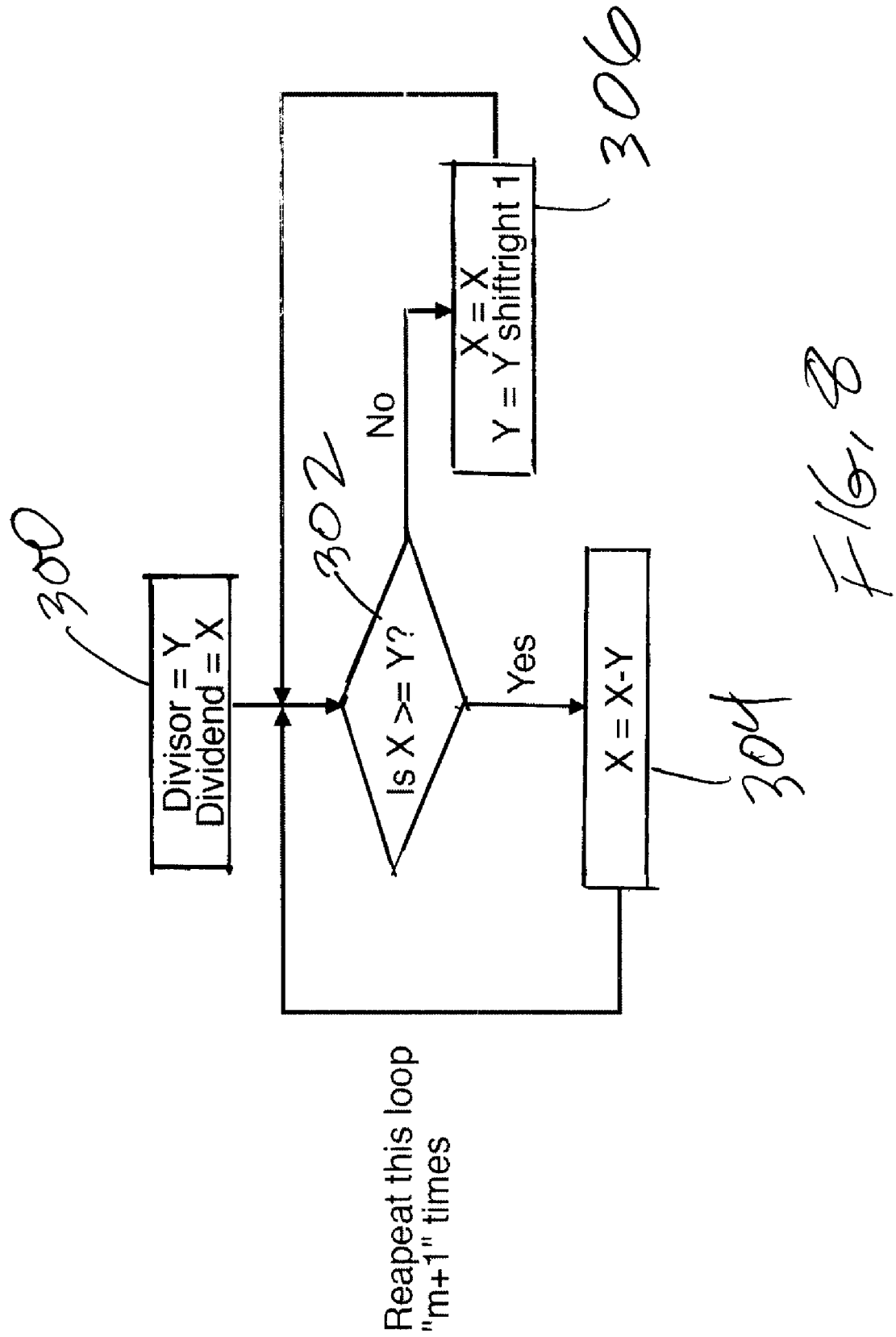
FIG. 8 is a high level flow chart illustrating a basic remainder algorithm.

In normal long division, all of the bits of the divisor are subtracted from an equal number of MSB bits of the dividend. The divisor is then shifted one bit to the right relative to the dividend and subtracted again. This process repeats until the divisor is subtracted from an equal number of LSB bits of the dividend. FIG. 8 illustrates this process in more detail. Starting with divisor Y and dividend X at 300 it is first determined at 302 whether the MSB bits of the dividend equal in number to the number of bits of the divisor is a larger quantity than the divisor. If it is, the divisor is subtracted from the dividend at 304. When the dividend is no longer greater than or equal to the divisor, the divisor is shifted one bit to the right at 306 and the process is repeated. At the end of m+1 repetitions (m is the number of bits of the dividend minus the number of bits of the divisor), the difference calculated at 304 will be the remainder.

According to the presently preferred embodiment, the number of bits of the divisor is configurable so that the user can select the maximum amount of delay that is compensated. However, the presently preferred embodiment is implemented in hardware, thus the normal remainder function must be modified.

According to one aspect of the invention, the Chunk_Value can be represented by a twenty-one bit number and the Address_Range_for_VCG is configurable by the config block 18 from a minimum of eight bits to a maximum of twenty-one bits. As such, a fourteen stage pipeline is used to perform the division and obtain the remainder. In order to implement this in hardware, the algorithm preferably always goes through fourteen pipeline stages.

Figure 9:
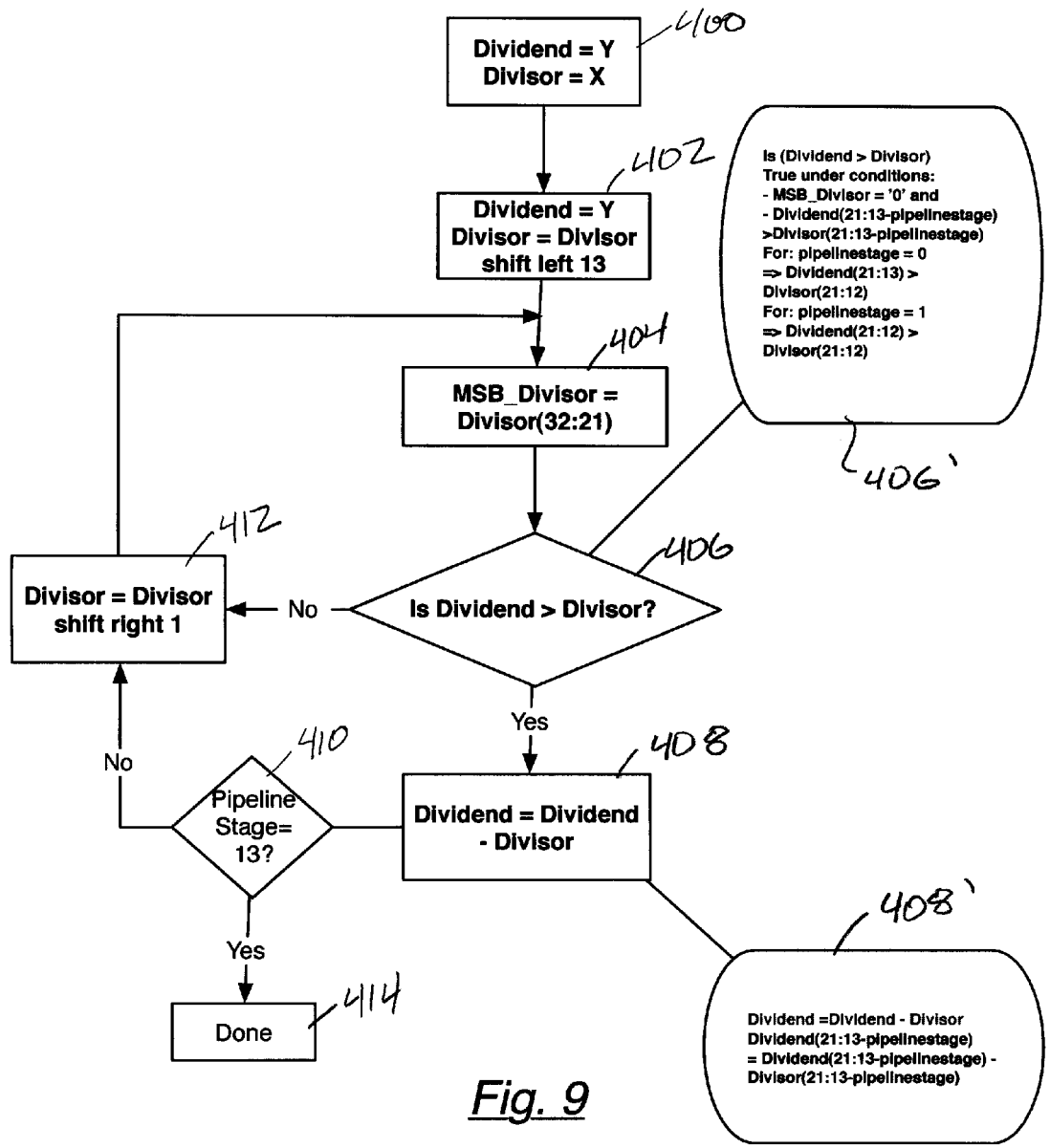
FIG. 9 is a more detailed flow chart illustrating the long division remainder algorithm according to the invention.

FIG. 9 illustrates the long division remainder algorithm according to the invention. Starting at 400 with the dividend and the divisor, before the first stage, the divisor is shifted thirteen bits left at 402. This assures that if the divisor has the minimum eight bits, they will be aligned with the eight MSB bits of the of the dividend. However, if the divisor had an original length of twenty-one bits, its MSB bits will now be more significant than the MSB bits of the dividend. In order to account for this possibility, a variable called MSB_Divisor is created from bits thirty-two to twenty-one of the divisor at 404. Then it is determined at 406 whether the dividend is greater than the divisor. This condition is true according to the rules listed in 406', i.e. the MSB_Divisor must be zero (the MSB of the divisor were not shifted left of the MSB of the dividend) and the bits being compared show the dividend to be greater than the divisor.

As illustrated in 406', at each stage of the pipeline more bits of the dividend are compared to more bits of the divisor starting with bits twenty-one through thirteen and ending with bits twenty-one through zero.

So long as the conditions of 406, 406' are met the dividend is given a new value at 408 by subtracting the divisor from the dividend. As illustrated in 408', the subtraction that takes place at 408 is a subtraction of the bits being compared, i.e. eight in the first pipeline stage, nine in the second, ... twenty-one in the last. If, as determined at 410, the pipeline is not complete, the divisor is shifted one bit to the right at 412 and the process is repeated at 404. Whenever it is determined at 406 that the dividend is not greater than the divisor, no subtraction is performed, the divisor is shifted right at 412 and the process continues at 404.

At the end, a remainder results which could be as large as eighteen bits if the entire 2048 range is compensated. For ten VLI frames an 8 bit number results in this example; for DS-1 there are twenty-three twenty-five byte chunks or an address range per VLI byte of 575. Ten VLI bytes will require 5750 addresses for storage per DS-1 VCG member.

The efficient use of deskewing storage according to the invention can permit storage on the same chip as the VCAT/LCAS processor.

There have been described and illustrated herein several embodiments of an efficient scalable implementation of VCAT and LCAS for both SDH and PDH signals. While particular embodiments of the invention have been described, it is not intended that the invention be limited thereto, as it is intended that the invention be as broad in scope as the art will allow and that the specification be read likewise. Thus, while the synchronizers/desynchronizers and mappers/demappers have been shown as separate units and described as single units, it will be appreciated that they could be either. In addition, while an important aspect of the invention has been the use of a single VCAT/LCAS unit to process both PDH and SDH, the other components could differ. It will therefore be appreciated by those skilled in the art that yet other modifications could be made to the provided invention without deviating from its spirit and scope as claimed.

What is claimed is:

1. An apparatus for extracting data from virtually concatenated (VCAT) plesiochronous digital hierarchy (PDH) streams carried in a synchronous digital hierarchy (SDH) signal, comprising:
   an SDH overhead and pointer processor coupled to a SONET network;
   a first telecom bus coupled to said SDH overhead and pointer processor;
   a second telecom bus coupled to an SDH VCAT demapper;
   a plurality of PDH units coupled between said first telecom bus and said second telecom bus, said plurality of PDH units providing PDH demapping and PDH frame synchronization according to a gapped clock produced by said PDH demapping to generate at least one serialized bit stream as well as providing serial to parallel conversion of said at least one serialized bit stream into bytes for supply to said second telecom bus;
   a signal path connecting said first telecom bus and said second telecom bus, said signal path distinct from said plurality of PDH units; and
   a configuration block for selectively controlling operation of said SDH VCAT demapper in one of a first mode and second mode, wherein
      in said first mode, bytes produced by said SDH overhead and pointer processor are supplied to said SDH VCAT demapper over said first telecom bus, said signal path and said second telecom bus, and
      in said second mode, bytes produced by said SDH overhead and pointer processor are supplied to said plurality of PDH units over said first telecom bus for processing and output to said SDH VCAT demapper over said second telecom bus;
   wherein said SDH VCAT demapper deskews members of a virtual concatenated group (VCG) associated with frames containing virtual concatenation link capacity adjustment scheme information (VLI) by
      selecting an acceptable delay which is less than the maximum compensable delay between members,
      dividing each VLI frame into chunks,
      assigning each chunk a number based on the multi-frame indicator (MFI) range and the number of chunks per VLI frame, and
      temporarily storing chunks in a memory at an address dictated by a remainder function, the remainder function operating on the acceptable delay and a respective chunk number.

2. An apparatus according to claim 1, further comprising:
a GFP demapper coupled to said SDH VCAT demapper.

3. An apparatus according to claim 2, further comprising:
an Ethernet MAC coupled to said GFP demapper.

4. An apparatus according to claim 1, wherein:
said PDH units include PDH demappers and PDH frame synchronizers.

5. An apparatus according to claim 4, further comprising:
a control decoder coupled to said first telecom bus, to said SDH VCAT demapper, and to said PDH demappers.

6. An apparatus according to claim 5, further comprising:
a low order pointer processor coupled to said first telecom bus, to said control decoder, and to said SDH VCAT demapper.

7. A method according to claim 1, wherein:
the remainder function includes long division.

8. A method according to claim 7, wherein:
the long division is performed iteratively before a remainder is determined and the remainder is used to address the memory.

9. A method according to claim 7, wherein:
the divisor of the long division is configurable.

10. A method according to claim 1, wherein:
the memory address for temporary storage of chunks is calculated according to the equation $$\text{Address}(i) = (\text{Chunk\_Value} \% \text{Address\_Range\_for\_VCG}) + i * \text{Address\_Range\_for\_VCG}$$

where "i" is the member number, "%" is a remainder function and Address_Range_for_VCG is the maximum delay to be compensated.

11. A method for extracting data from virtually concatenated (VCAT) plesiochronous digital hierarchy (PDH) streams carried in a synchronous digital hierarchy (SDH) signal, comprising:
   processing the SDH signal with an SDH overhead and pointer processor to generate bytes corresponding thereto;

in a first mode, transferring bytes generated by the SDH overhead and pointer processor to a first telecom bus and then to a second telecom bus over a signal path connecting said first telecom bus to said second telecom bus for output to an SDH VCAT demapper coupled to said second telecom bus; and in a second mode, transferring bytes generated by the SDH overhead and pointer processor to a first telecom bus and then to a plurality of PDH units coupled to the first telecom bus, said plurality of PDH units providing PDH demapping and PDH frame synchronization according to a gapped clock produced by said PDH demapping to generate at least one serialized bit stream as well as providing serial to parallel conversion of said at least one serialized bit stream into bytes for supply to said second telecom bus and output to said SDH VCAT demapper coupled to said second telecom bus;

wherein said SDH VCAT demapper deskews members of a virtual concatenated group (VCG) associated with frames containing virtual concatenation link capacity adjustment scheme information (VLI) by selecting an acceptable delay which is less than the maximum compensable delay between members, dividing each VLI frame into chunks, assigning each chunk a number based on the multi-frame indicator (MFI) range and the number of chunks per VLI frame, and temporarily storing chunks in a memory at an address dictated by a remainder function, the remainder function operating on the acceptable delay and a respective chunk number.

12. A method according to claim 11, further comprising:
demapping GFP frames output from said SDH VCAT demapper.

13. The method according to claim 12, further comprising:
extracting Ethernet frames from the GFP frames.

14. A method according to claim 11, wherein:
the remainder function includes long division.

15. A method according to claim 14, wherein:
the long division is performed iteratively before a remainder is determined and the remainder is used to address the memory.

16. A method according to claim 14, wherein:
the divisor of the long division is configurable.

17. A method according to claim 11, wherein:
the memory address for temporary storage of chunks is calculated according to the equation $$Address(i) = (Chunk\_Value \% Address\_Range\_for\_VCG) + i * Address\_Range\_for\_VCG$$

where "i" is the member number, "%" is a remainder function and Address_Range_for_VCG is the maximum delay to be compensated.

18. A method for processing a synchronous digital hierarchy (SDH) signal carrying a virtual concatenated group (VCG), the VCG associated with frames containing virtual concatenation link capacity adjustment scheme information (VLI), the method comprising:

a) providing a demapper that processes members of the VCG; and b) operating the demapper to deskew members of the VCG by
  i) selecting an acceptable delay which is less than the maximum compensable delay between members;
  ii) dividing each VLI frame into chunks;
  iii) assigning each chunk a number based on the multi-frame indicator (MFI) range and the number of chunks per VLI frame; and
  iv) temporarily storing chunks in a memory at an address dictated by a remainder function, the remainder function operating on the acceptable delay and a respective chunk number.

19. A method according to claim 18, wherein:
the remainder function includes long division.

20. A method according to claim 19, wherein:
the long division is performed iteratively before a remainder is determined and the remainder is used to address the memory.

21. A method according to claim 19, wherein:
the divisor of the long division is configurable.

22. A method according to claim 18, wherein
the memory address for temporary storage of chunks is calculated according to the equation $$Address(i) = (Chunk\_Value \% Address\_Range\_for\_VCG) + i * Address\_Range\_for\_VCG$$

where "i" is the member number, "%" is a remainder function and Address_Range_for_VCG is the maximum delay to be compensated.

* * * * *

UNITED STATES PATENT AND TRADEMARK OFFICE
CERTIFICATE OF CORRECTION

PATENT NO. : 7,630,397 B2
APPLICATION NO. : 11/553151
DATED : December 8, 2009
INVENTOR(S) : Kundu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Second Day of November, 2010

David J. Kappos
*Director of the United States Patent and Trademark Office*